Patented Dec. 12, 1950

2,534,018

UNITED STATES PATENT OFFICE 2,534,018

PREPARATION OF POLYFUNCTIONAL COMPOUNDS

William F. Gresham and Carl E. Schweitzer, Wilmington, Del., assignors to E. I. du Pont de Nemours & Company, Wilmington, Del., a corporation of Delaware No Drawing. Application August 11, 1949, Serial No. 109,802

7 Claims. (Cl. 260—449.6)

This invention relates to a novel synthesis of polyfunctional oxygen-containing organic compounds and more particularly to the preparation of polyhydric alcohols and their derivatives by reactions involving the use of carbon monoxide and/or carbon dioxide and hydrogen as starting materials. More specifically, the invention concerns a process for reacting carbon monoxide with hydrogen in the presence of an aqueous or alcoholic solution of cobaltous fluoride as catalyst.

It has been known for many years that monofunctional compounds, such as methanol, can be obtained by reaction between carbon monoxide and hydrogen at elevated pressures, e. g. at pressures up to about 1000 atmospheres. By reaction between carbon monoxide and methanol in the presence of certain types of catalysts, other monofunctional compounds such as acetic acid, methyl acetate, etc., have also been obtained. Other processes for reacting carbon monoxide with hydrogen at high pressures have employed cobalt or cobalt carbonyl as the catalyst, and have resulted in the formation of hydrocarbons or monohydroxyalkanes, but not polyfunctional compounds. In copending application S. N. 793,521, filed December 23, 1947, it is disclosed that polyfunctional compounds can be prepared by reaction between carbon monoxide and hydrogen at pressures above 1000 atmospheres in the presence of a cobalt-containing catalyst.

An object of this invention is to provide a process for the preparation of polyfunctional oxygen-containing organic compounds by reaction between an oxide of carbon and hydrogen, in the presence of a cobalt-containing catalyst which is readily recoverable and which is not readily converted to cobalt carbonyl. Another object of the invention is to provide an improved process for the synthesis of ethylene glycol directly from carbon monoxide and hydrogen. Still another object is to provide a process for the synthesis of higher polyhydroxyalkanes and their derivatives from carbon monoxide and hydrogen. Other objects of the invention will appear hereinafter.

It has been discovered, in accordance with this invention, that cobalt fluoride is a highly effective and useful catalyst for the reaction between carbon monoxide and hydrogen; moreover, it has also been discovered that if the hydrogenation of an oxide of carbon is carried out at a sufficiently high pressure, in the presence of water or an alcohol, and a cobalt fluoride, e. g. cobaltous fluoride, polyfunctional compounds, rather than monofunctional compounds, are produced, and virtually none of the catalyst is lost by conversion to cobalt carbonyl. The present invention thus provides an improved method for preparing polyfunctional compounds from carbon monoxide and hydrogen in accordance with the equation $nCO+(n+1)H_2=H(CHOH)_nH$, $n$ being an integer greater than 1. In general, formate esters of the polyhydroxyalkanes are simultaneously produced. Furthermore, the reaction may be carried out in the presence of an esterifying reactant, such as acetic acid, whereby esterification of the hydroxyl groups in the compound $H(CHOH)_nH$ can occur, at least in part.

The formation of ethylene glycol, and formates thereof, from carbon monoxide and hydrogen in accordance with this invention may be represented as follows:

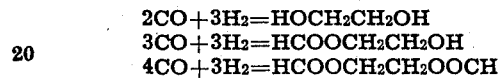

Glycerol triacetate is also obtained in the practice of the invention, under conditions specified hereinafter, in accordance with the following equation:

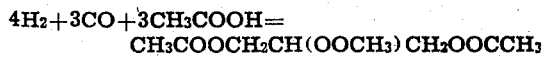

In the hydrogenation of oxides of carbon at pressures below about 1500 atmospheres, virtually no polyfunctional compounds are produced. At a pressure of about 1500 atmospheres and especially at pressures of about 2000 to 5000 atmospheres, polyfunctional compounds are obtained.

The reaction between carbon monoxide or carbon dioxide and hydrogen in accordance with this invention may be carried out either in the vapor phase or in the liquid phase. Inert diluents may be employed as desired, such as inert organic solvents, e. g. hydrocarbons, alcohols, esters, and the like. It is also possible to employ solvents which react with the polyhydric alcohols which are in general produced in the practice of the invention. These reactive solvents include organic carboxylic acids and anhydrides of organic carboxylic acids, such as formic acid, acetic acid, propionic acid, stearic acid, benzoic acid, phthalic anhydride, acetic anhydride, benzoic anhydride and the like. Polyhydric alcohol esters may be employed as reaction media in the practice of the invention; for example, glycol formates or acetates are especially effective, and are particularly useful in embodiments which involve recycling of a part of the reaction mixture. The presence of either inert or reactive diluents facilitates removal of heat from the reaction mixture. A suitable diluent which can be employed in the practice of the invention is ordinary water, which, in preferred embodiments, may be present in sufficient quantity to prevent the formation of hydrolyzable products, such as esters, if desired.

Certain solvents have a highly significant directing effect upon the course of the reaction, in the practice of this invention. For example, if water is used difunctional compounds, such as ethylene glycol and its formate esters, are formed selectively. When the solvent is acetic acid, acetates of polyhydric alcohols are produced at a rapid rate, and certain other acetate esters are produced at the same time.

The quantity of cobalt fluoride catalyst which is employed is not highly critical, but it is generally desirable to use a sufficient quantity of catalyst to effect a reasonably rapid reaction, e. g. about 0.001% to about 20% by weight, based on the total quantity of reaction mixture. The cobalt fluoride may, of course, be recovered and reused as a catalyst in accordance with the invention.

The temperatures which may be employed in the practice of the invention vary rather widely, and, in preferred embodiments, the use of extremely high pressures permits carrying out the reaction at relatively low temperatures. The rate of formation of polyfunctional organic product obtainable at temperatures below 150° is extremely slow even at pressures in excess of about 2000 atmospheres. It is therefore desirable to employ temperatures above 150° to obtain a reasonably high reaction rate even though, from the standpoint of the composition of the reaction mixture under equilibrium conditions, it is desirable to operate at as low a temperature as possible. Temperatures above about 400° are generally not preferred even at pressures as high as 3000 atmospheres, because while the rate of formation of glycol or other polyfunctional product is improved by increasing the reaction temperature, the yield, based upon the quantity of carbon monoxide and hydrogen initially present, is poor at temperatures above about 400° C. Within the relatively narrow temperature range of 180° to 300° C., at pressures above 1500 atmospheres, outstanding results are obtained from the standpoint of yield and reaction rate.

The relative amounts of carbon monoxide and hydrogen which are present initially in the reaction mixture in the practice of the invention may be varied over a wide range, but it is generally preferred that the mol ratio of $CO:H_2$ be within the range of 10:1 to 1:10, best results being obtained when the ratio of $CO:H_2$ is from about 2:1 to about 1:5. It is, of course, to be understood that reaction mixtures which give rise to the formation of carbon monoxide and hydrogen under the reaction conditions may be employed instead of the mixtures of carbon monoxide and hydrogen which are used in preferred embodiments in the practice of the invention. For example, good results are obtained when the reaction mixture is composed of carbon dioxide and hydrogen. Mixtures of carbon dioxide and carbon monoxide with hydrogen may, of course, also be employed. Other mixtures such as carbon monoxide and steam, or carbon dioxide and steam, may be used if desired. Metal carbonyls and metal carbonyl complexes may be used to supply the carbon monoxide reactant, and the quantity of metal carbonyl thus employed may be varied over the widest possible range; in certain instances, this tends to lower somewhat the pressure which is required for the formation of polyfunctional compounds in the practice of the invention.

The process of the invention may be carried out either continuously or batchwise. Optimum results are generally obtained at the shortest reaction times capable of giving an appreciable conversion to the desired product. When primary reaction products, or simple difunctional compounds, are desired in maximum yield (i. e. without the formation of excessive quantities of by-products), it is preferable to operate at relatively low conversions. In the continuous process it is generally desirable to recirculate the unreacted gas, preferably with make-up carbon monoxide and hydrogen. In one preferred method of practicing the invention a high pressure separator is employed to remove the polyfunctional organic product (e. g. ethylene glycol crude) from the reaction mixture. Other methods known in the art may be employed for separating from the reaction mixture the polyfunctional compounds obtained in the practice of this invention. Suitable methods include distillation, fractional condensation, extraction, etc.

Since the formation of polyhydric alcohols and the like from carbon monoxide and hydrogen in accordance with this invention is an exothermic process, suitable means should be provided for withdrawal of heat from the reaction mixture while the reaction is in progress. This removal of heat can be accomplished by any convenient method and in a specific embodiment is effected by carrying out, simultaneously with the reaction between the oxide of carbon and hydrogen, an endothermic process under such conditions that the heat evolved by the exothermic reaction is at least in part absorbed by the endothermic process.

The reaction between the oxide of carbon and hydrogen in accordance with this invention can be carried out in any suitable reaction vessel capable of withstanding very high pressures. Reaction vessels which are made of or lined with materials which remain inert in the presence of the reaction mixture are preferably employed, i. e. the reaction vessel may be made of steel which, if desired, can be lined with such inert materials as silver, copper, platinum, gold, platinum-iridium alloy, platinum-ruthenium alloy, refractories, etc.

The invention is illustrated further by means of the following examples.

*Example 1.*—A mixture containing 50 grams of water, 50 grams of benzene and 2 grams of cobaltous fluoride ($CoF_2$) was heated under a pressure of 3000 atmospheres with a gas consisting of 1 mol of carbon monoxide per 2 mols of hydrogen, at a temperature of 275° to 290° for 15 minutes. Distillation of the resulting mixture gave a benzene-water fraction, and a high boiling water soluble fraction (B. P. 63° C./1 mm., weight 9.6 grams). The distillation residue which contained the cobalt fluoride catalyst weighed 2.4 grams. The main fraction contained ethylene glycol as the chief ingredient, together with a minor amount of ethylene glycol formate. The process could be repeated, using the recovered distillation residue as catalyst.

*Example 2.*—A mixture consisting of 100 grams of water and 2 grams of cobaltous fluoride was heated with carbon monoxide and hydrogen (mol ratio 1:2) under a pressure of 3000 atmospheres at a temperature of 275° to 278° C. for 15 minutes. Distillation of the resulting product gave 13.3 grams of material boiling at 44° to 50° at 100 mm., 100 grams of water, 1.0 gram of an alcohol boiling at 30°/25 mm., and 8.4 grams of polyhydric alcohol plus formate ester, B. P. 67° to 79°/2 mm. The distillation residue weighed 2.4 grams, and contained all of the cobalt fluoride catalyst.

*Example 3.*—A mixture containing 100 grams methanol, and 2 grams cobaltous fluoride was heated with carbon monoxide and hydrogen (mol ratio 1:2) at 275° to 278° C. under a pressure of 3000 atmospheres for 15 minutes. The resulting product contained 9.6 grams of material boiling higher than butanol, including ethylene glycol and formate esters. This material boiled over a very wide range (43° C./5 mm. to 152° C./1 mm.) with no plateaux indicating a high percentage of any single product.

It is to be understood that the above examples are illustrative only, since numerous ways of practicing the invention will occur to those who are skilled in the art.

In general, either water or an alcohol diluent (preferably a monohydric alkanol having from 1 to 4 carbon atoms per molecule) is generally employed, for obtaining optimum results. Other diluents, in general, have a detrimental effect unless water or an alcohol is initially present. Thus, lower alcohols but no glycol fractions or other high boiling products were obtained from carbon monoxide and hydrogen at 3000 atmospheres pressure (275° C.) in benzene as a diluent when no water was present. Ethylene glycol is a suitable diluent, and, in fact, the formation of polyhydroxyalkanes and formate esters thereof takes place, to some extent, in the absence of any diluent at 3000 atmospheres pressure but this system is difficult to control, probably because of insufficient means for dissipation of heat from the reaction zone. This results in the formation of by-products, particularly low boiling alcohols and their formate esters.

The products obtained by the process of this invention are highly valuable and useful. For example, the alcoholic products can be esterified with monobasic or polybasic organic or inorganic acids to form plasticizers, solvents, etc.

Since numerous methods of practicing the invention will occur to those who are skilled in the art, it is to be understood that we do not limit ourselves except as set forth in the following claims.

We claim:
1. A process for the preparation of polyhydric alcohols and formate esters thereof which comprises reacting an oxide of carbon with hydrogen in the presence of a cobaltous fluoride catalyst in an aqueous or alcoholic medium at a temperature of 150° to 400° C. and a pressure above 1500 atmospheres and separating polyhydric alcohol and formate ester thereof from the resulting product.

2. The process of reacting an oxide of carbon with hydrogen at a pressure within the range of 1500 to 5000 atmospheres at a temperature of 150° to 400° C. in the presence of a catalytic quantity of cobaltous fluoride dissolved in water, and thereafter separating from the resulting mixture the polyfunctional oxygen-containing organic product formed by the ensuing reaction.

3. The process of reacting carbon monoxide with hydrogen at a pressure within the range of 2000 to 5000 atmospheres at a temperature of 180° to 300° C. in the presence of a catalytic quantity of cobaltous fluoride dissolved in water, and thereafter separating from the resulting mixture the polyfunctional oxygen-containing organic product formed by the ensuing reaction.

4. The process of reacting carbon monoxide with hydrogen at a pressure within the range of 2000 to 5000 atmospheres at a temperature of 180° to 300° C. in the presence of a catalytic quantity of cobaltous fluoride dissolved in water, and in the presence also of an inert hydrocarbon liquid diluent, and thereafter separating from the resulting mixture the polyfunctional oxygen-containing organic product formed by the ensuing reaction.

5. The process of claim 4 in which the inert hydrocarbon liquid diluent is benzene.

6. The process of claim 4 in which the mol ratio of $Co:H_2$ is initially from 10:1 to 1:10.

7. The process of claim 4 in which the mol ratio of $Co:H_2$ is initially from 2:1 to 1:5.

WILLIAM F. GRESHAM.
CARL E. SCHWEITZER.

REFERENCES CITED

The following references are of record in the file of this patent:

UNITED STATES PATENTS

| Number | Name | Date |
|---|---|---|
| 1,681,751 | Storch | Aug. 21, 1928 |
| 2,194,186 | Pier et al. | Mar. 19, 1940 |
| 2,245,157 | Pier et al. | June 10, 1941 |
| 2,287,891 | Linckh | June 30, 1942 |
| 2,480,341 | Seelig et al. | Aug. 30, 1949 |